United States Patent [19]

Cecil

[11] Patent Number: 5,493,093
[45] Date of Patent: Feb. 20, 1996

[54] COMPUTER-INTEGRATED MULTI-GUN WELDING SYSTEM

[76] Inventor: Dimitrios G. Cecil, 1277 Ashover Dr., Bloomfield Hills, Mich. 48304

[21] Appl. No.: 198,253

[22] Filed: Feb. 18, 1994

Related U.S. Application Data

[63] Continuation-in-part of Ser. No. 911,173, Jul. 9, 1992, Pat. No. 5,288,968.

[51] Int. Cl.⁶ .................................................. B23K 11/24
[52] U.S. Cl. ...................................... 219/110; 219/86.41
[58] Field of Search .......................... 219/86.41, 91.1, 219/110

[56] References Cited

U.S. PATENT DOCUMENTS

| | | | |
|---|---|---|---|
| 4,317,980 | 3/1982 | Goodrich et al. | 219/110 |
| 4,562,330 | 12/1985 | Hamilton . | |
| 4,787,143 | 11/1988 | Yagi et al. . | |
| 4,841,113 | 6/1989 | Hamada et al. | 219/110 |
| 4,984,171 | 1/1991 | Tsujii | 219/86.41 |
| 5,258,598 | 11/1993 | Alborante | 219/86.41 |

*Primary Examiner*—Clifford C. Shaw
*Attorney, Agent, or Firm*—Brooks & Kushman

[57] ABSTRACT

A method and apparatus are disclosed for monitoring and controlling a multi-gun resistance welding apparatus. An embodiment of the system comprises a computer which executes a routine that allows supervision of the multi-gun welding system, a programmable logic controller which controls movement of the guns and gun delivery devices, gun sensors which measure the displacement of gun electrodes, delivery device sensors for determining a location of the gun delivery devices, fixture sensors for measuring the location of a workpiece fixture, a weld controller which applies power to the gun electrodes, and an analog-to-digital converter which converts the outputs of the sensors to digital signals readable by the computer. An embodiment of the weld routine executed by the computer spatially gauges the pre-weld fit-up of the workpieces and inhibits the application of weld power if the fit-up is not within a specified tolerance. The embodiment of the routine detects stuck gun conditions after the weld, and performs a weld analysis to diagnose various faults during the welding based upon electrode position. An embodiment of a retro-fit gun sensor is presented which utilizes an electrode positioning bracket coupled to the electrode. The position of the bracket is measured by means of a linear variable displacement transducer. Using the retro-fit gun sensor, the computer-integrated welding system can be readily incorporated into commercially-available multi-gun welding systems.

50 Claims, 8 Drawing Sheets

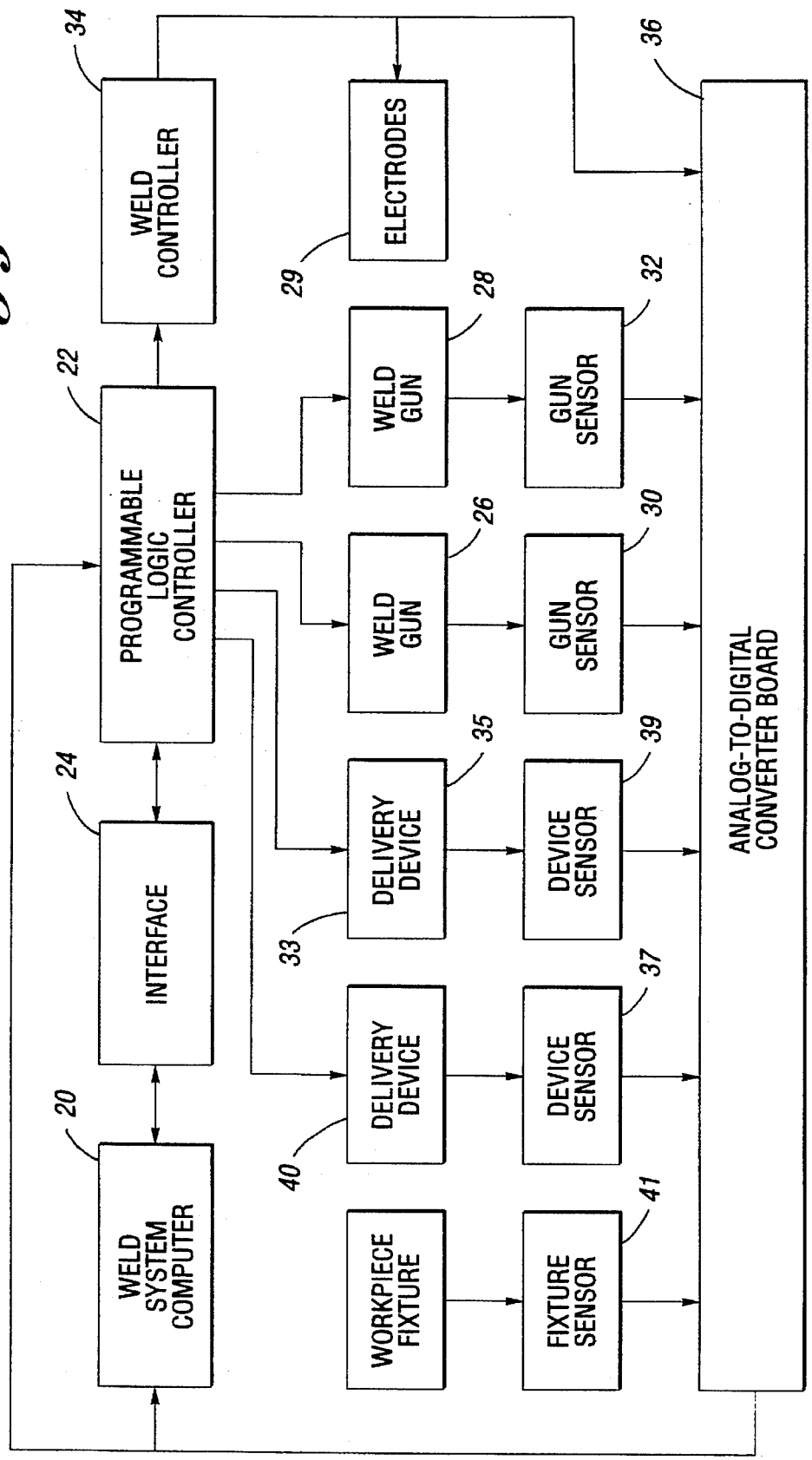

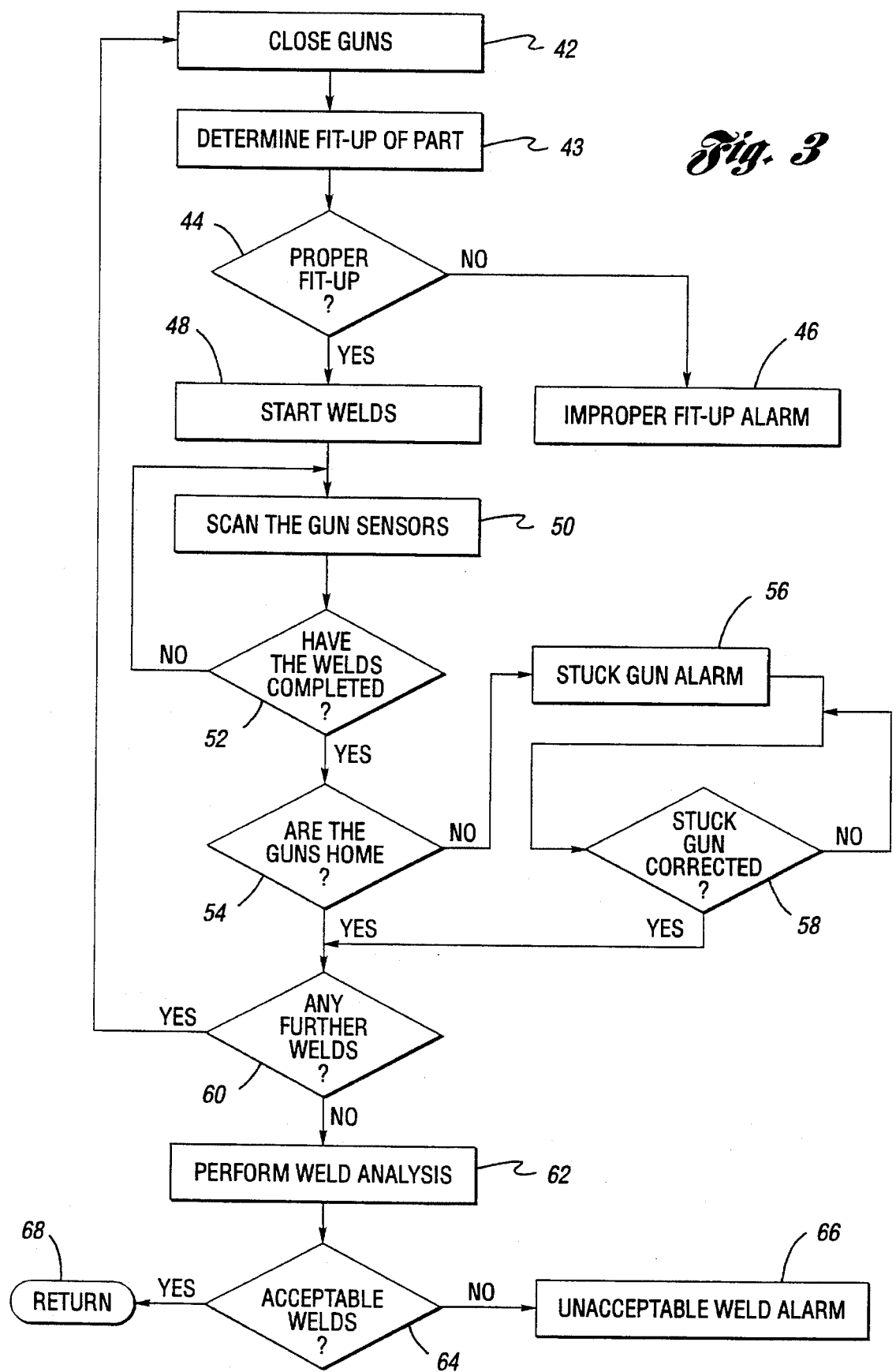

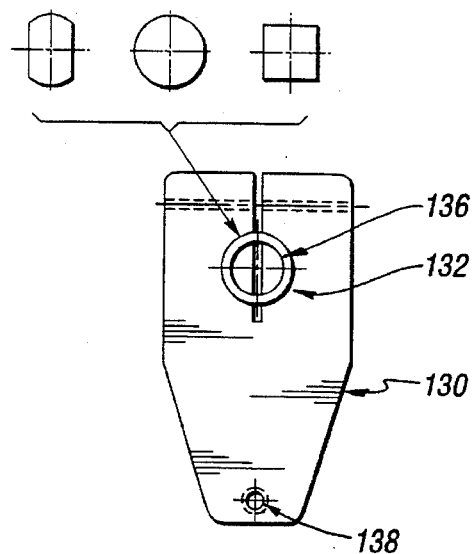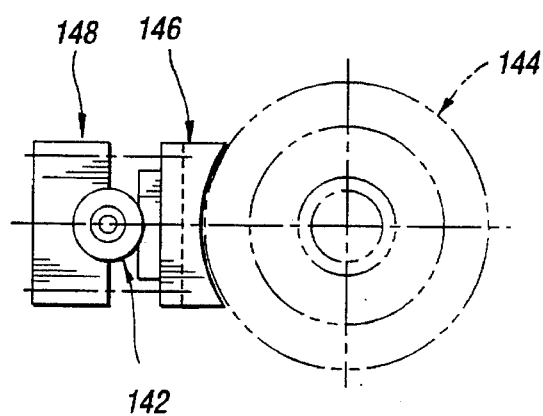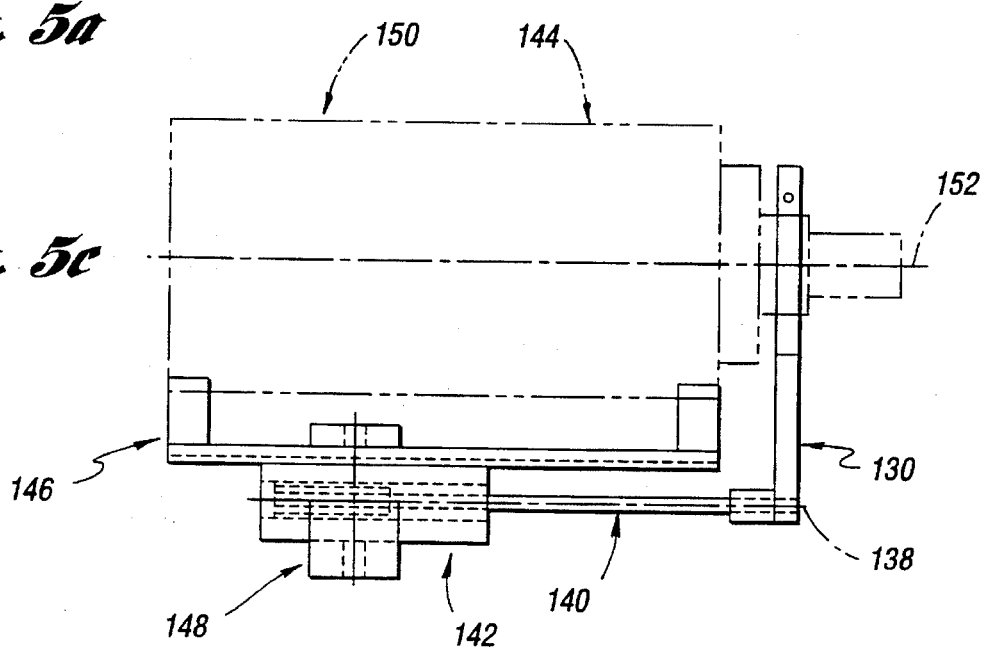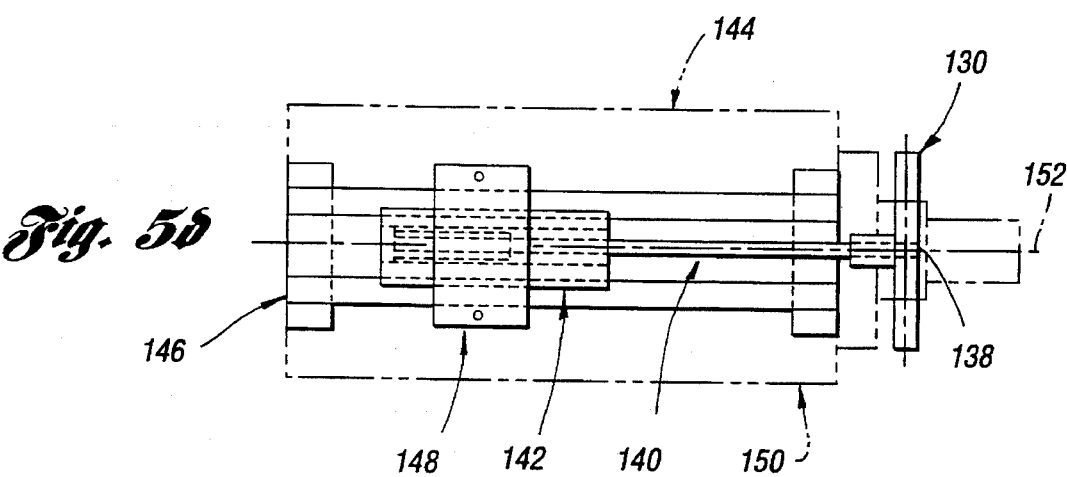

COMPUTER-INTEGRATED MULTI-GUN WELDING SYSTEM

CROSS-REFERENCE TO RELATED APPLICATION

This application is a continuation-in-part of applicant's pending application Ser. No. 07/911,173, filed Jul. 9, 1992 now U.S. Pat. No. 5,288,968, commonly assigned with the present invention.

TECHNICAL FIELD

This invention relates to welding guns, and more particularly, to resistance welding guns used in conjunction with an automated welding system.

BACKGROUND ART

Conventional resistance spot welding techniques employ a method by which metal surfaces are joined together in one or more spots. Workpieces are held together under force by one or more electrodes. The contacting surfaces are heated by a pulse of high amperage current generated by contact with the electrodes to form what is known as a weld nugget at the interface between the surfaces. When the flow of current ceases, the electrode force is ordinarily maintained for a short period of time to allow the weld nugget to cool and solidify forming a strong mechanical bond. An excellent discussion of the details of the metallurgical phenomena that occurs during resistant spot welding is found in Nied "The Finite Element Modeling of the Resistance Spot Welding Process", Welding Research Supplement, pp. 123–132 (Apr. 1984).

A multi-gun resistance welding apparatus comprises a plurality of resistance welding guns for simultaneously performing many resistance welds. The multi-gun apparatus can be in the form of a press in which the plurality of guns are mounted, or in the form of individually positionable guns which can advance upon a workpiece, perform a weld, and then retract from the workpiece. The guns can be advanced and retracted either manually, or robotically using an automatic indexing device. The use of multi-gun resistance welding machines is popular for high-volume production work such as joining automotive components for both passenger and commercial vehicles. Typical applications include complete truck cabs, air vent cowls, air cleaner components, passenger car hoods, motor compartments, body sides, rear quarters, deck lids, and load floors. The popularity of multi-gun resistance spot welding is due in large part to its capability of rapidly producing welds with an apparatus that can be used in automated production.

A brief description of a representative task performed by a multi-gun welding system is as follows. First, a workpiece which is to be welded using the multi-gun welding system is positioned by means of a weld part fixture. For the purpose of the present invention, the term "workpiece" can denote a plurality of workpieces which are to be welded together, or in a case such as projection welding, can denote a single workpiece onto which another workpiece loaded in the gun is welded. After the workpiece is positioned, a plurality of weld guns (not necessarily all of the weld guns of the system) advance upon the workpiece. Each of the weld guns comprises at least one electrode, wherein each electrode is positionable with respect to its corresponding weld gun by a powered cylinder along a cylinder rod axis. A common configuration for electrodes within a weld gun has two electrodes, one being a welding electrode and the other being a ground electrode, in opposing relation to each other. A configuration for single-electrode resistance welding has the ground electrode permanently attached to the top of the part fixture.

A plurality of the electrodes then advance upon the workpiece, causing electrical contact to be initiated with the workpiece. Next, a voltage potential is applied to each of the plurality of electrodes. This causes an electrical current to flow through the electrodes (welding and ground), whereby a resulting electrical heating induces the formation of weld nuggets. Finally, the electrodes are retracted from the workpiece. The workpiece can then be translated or rotated so that another plurality of electrodes can be advanced upon the workpiece for further welding, or another workpiece can be introduced to the apparatus for welding.

Although multi-gun resistance spot welding has many advantages for high-volume production work, there are some complications that can occur. First, the positioning of the workpieces before welding power is applied, known as pre-weld fit-up, significantly affects weld quality and electrode life. A poor fit-up condition can occur when workpieces of superior quality are improperly positioned with respect to one another. A poor fit-up condition can also occur with properly positioned workpieces of inferior quality. A further condition of poor fit-up can occur when superior-quality workpieces, positioned properly with respect to one another, are not positioned properly with respect to the electrodes. Poor fit-up conditions reduce effective weld pressure by an amount required to squeeze the workpieces together. This reduction of pressure can lead to excessive weld heat, and, more severely, possible weld blowouts which increase electrode wear and further can require an electrode change. Moreover, improper position and orientation of the workpieces with respect to the electrodes can produce inferior quality welds.

U.S. Pat. No. 5,220,145 to Cecil et al. discloses a single-gun welding control system that monitors electrode displacement for detection of the poor fit-up condition. This system can detect poor fit-up caused by workpieces improperly positioned with respect to one another and by inferior-quality workpieces. However, it cannot spatially gauge the position and orientation of the workpieces due to its application in a single-gun apparatus.

A second difficulty in multi-gun resistance welding is in controlling the weld process satisfactorily in order to produce consistently good welds. Many different factors must be controlled such as voltage, current, pressure, heat loss, shunting, water temperature, and electrode wear, as well as the thickness and composition of the workpiece material. Many of these variables are difficult to consistently control. Several attempts have been made to automatically control resistance spot welding processes. For example, some techniques have been designed to regulate the amount of energy used during the weld cycle. To this end, current sensors and voltage regulators have been incorporated into feedback systems to compare the detected levels with certain preset references. These feedback systems are disadvantageous from the standpoint that they do not directly detect physical characteristics of the weld itself but instead rely upon detection of secondary parameters. This can lead to poor weld quality when uncontrolled parameters vary from nominal operating conditions.

Other techniques provide means for determining whether the metal of the workpieces have reached a molten state. If the metals to be welded do not reach the temperature required to become molten, an insufficient weld could result. It has been shown through measurements that when the molten state is reached, the electrodes, which are being forced against the workpiece, begin to move into the metal. Accordingly, it has been suggested that the detection of melting by sensing subsequent inward movement of the electrodes, called indentation or penetration, is a potentially good way of determining the state of the weld. However, just because the metal reaches a molten state, does not always ensure that a good weld is made. For example, too much weld current will produce melting, but will not necessarily produce the formation of the weld nugget which is an important factor in generating a good weld. Other parameters will effect the size and configuration of the weld nugget and the many prior techniques of merely sensing inward movement of the electrodes into the workpieces cannot readily determine the extent of weld nugget growth. Thus, penetration alone is insufficient to determine weld quality.

A resistance spot welding apparatus in U.S. Pat. No. 4,542,277 to Cecil discloses a device that automatically and consistently detects the quality of resistance spot welds. This device, however, requires a custom two-ended cylinder for mounting the sensor assembly. A shortcoming of this configuration is that it is not suitable for welding applications which require the space to the back of the cylinder for other functions such as the placement of mounting assemblies. Further, the two-ended cylinder configuration does not provide for electrical isolation of the sensor necessary in welding operations due to the high currents produced. Lack of electrical isolation produces noise on the sensor signal. Some of the noise can be eliminated using software processing algorithms or processing circuitry. However, this extra processing cannot be provided without cost, and at best, it will filter some of the desired signal and leave some of the noise behind.

A further obstacle in resistance welding occurs when an electrode becomes fused to a welding surface after completion of a weld, known as a stuck-gun condition. If the multi-gun welding system does not detect the stuck gun before attempting to reposition the workpiece or advancing other weld guns upon the workpiece, extensive damage to the apparatus is possible.

SUMMARY OF THE INVENTION

The need exists for a system that detects improper fit-up of the workpieces prior to applying weld power in multi-gun resistance welding systems, monitors and controls the formation of the weld nuggets, and checks for a stuck-gun condition and analyzes the quality of the plurality of welds after the welds have completed. A further need exists for such a system that can be readily integrated into commercially-available multi-gun welding systems and weld controllers.

It is thus an object of the present invention to provide a multi-gun computer-integrated welding system that detects improper fit-up of the workpieces prior to applying weld power in multi-gun resistance welding systems, monitors and controls the formation of the weld nuggets, and checks for a stuck-gun condition and analyzes the quality of the plurality of welds after the welds have completed.

Another object of the present invention is to provide a system for supervising a joining of a plurality of workpieces that detects improper fit-up of workpieces before welding power is initiated using a multi-gun welding apparatus.

A further object of this invention to provide a retro-fit electrode positioning bracket assembly for adapting an automated welding apparatus to allow incorporation of a electrode position transducer for use in determining weld quality.

In carrying out the above objects, the present invention provides a multi-gun computer-integrated welding system for joining a plurality of workpieces. The system comprises a plurality of weld guns, wherein each of the plurality of weld guns comprises a welding electrode, a cylinder assembly having a cylinder housing, and a piston and piston rod attached thereto for linearly displacing the welding electrode. Displacement sensing means are coupled to each of the weld guns for measuring displacements of the welding electrodes relative to the corresponding cylinders. Computing means issue supervisory commands based on the measured displacements. Control means control an application of force to the welding electrodes and control an application of electrical power to the welding electrodes based on the supervisory commands.

In carrying out the above objects, the present invention further provides a multi-gun computer-integrated welding system for supervising a joining of a plurality of workpieces. The system comprises a plurality of weld guns, wherein each of the plurality of weld guns comprises a welding electrode, a cylinder assembly having a cylinder housing, and a piston and piston rod attached thereto for linearly displacing the welding electrode. Displacement sensing means are coupled to each of the weld guns for measuring displacements of the welding electrodes relative to the corresponding cylinders. Fit-up verification means determine whether the displacements of the welding electrodes, when the welding electrodes are in contact with the plurality of workpieces, are within or outside a specified rejection region before welding power is applied. Weld power control means then initiate and continue an application of electrical power to the welding electrodes if the displacements are outside the specified rejection region, and inhibit the application of electrical power to the welding electrodes if the displacements are within the specified rejection region.

In carrying out the above objects, the present invention further provides a retrofit gun sensor for cooperation with a resistance welding apparatus. The retrofit gun sensor comprises an electrode-positioning bracket which is mechanically coupled to, but electrically isolated from, an electrode. A linear translation sensor, coupled to a cylinder housing, measures the relative position of the electrode positioning bracket with respect to the cylinder housing and generates an electrical signal in proportion to the relative position, wherein the transducer is displaced from, and parallel to a cylinder rod axis.

These and other features, aspects, and advantages of the present invention will become better understood with regard to the following description, appended claims, and accompanying drawings.

BRIEF DESCRIPTION OF THE DRAWINGS

FIG. 2 is a block diagram representation of an embodiment of the multi-gun welding computer system;

FIG. 3 is a flow chart of an embodiment of a weld routine executed within the weld system computer for performing a weld operation on a workpiece;

FIG. 5(A–D) is an elevation view of the electrode positioning bracket, an elevation view of the linear variable displacement transducer and mounting clamp assembly, a side view of the welding gun assembly, and a bottom view of the welding gun assembly;

DETAILED DESCRIPTION OF THE INVENTION

Figure 1A:
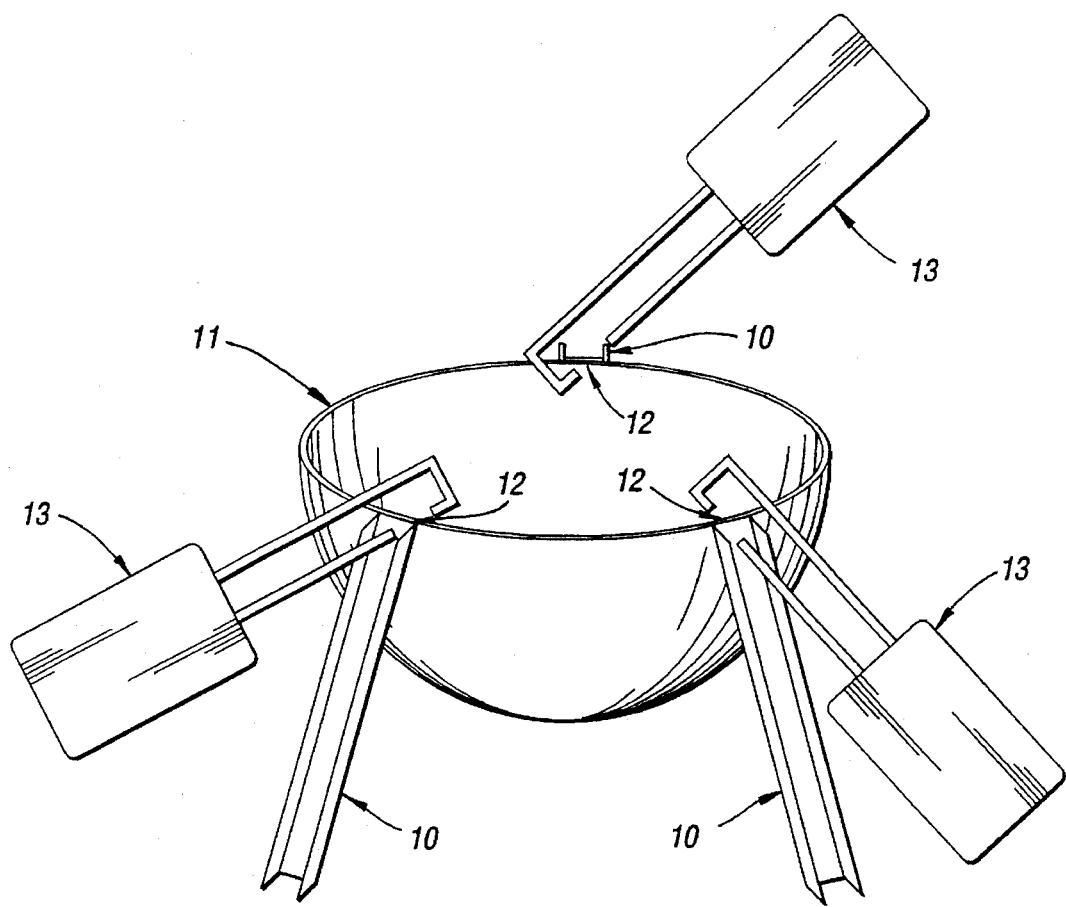
FIG. 1(A–B) is a schematic drawing of a multi-gun welding operation, and a perspective view of a multi-gun welding operation.

FIG. 1A illustrates an application of a multi-gun welding system wherein three legs 10 are to be welded to a barbecue grill 11. First, the three legs 10 are initially located at suitable joining locations 12 with respect to the barbecue grill 11. Next, three weld guns 13 advance upon the legs 10. The weld guns 13 then close, thus clamping the legs 10 to the grill 11 at the joining locations 12. Welding power is initiated to the weld guns 13 which causes the formation of weld nuggets (not shown). After the weld nuggets have formed, the weld guns 13 are opened and retracted.

Figure 1B:
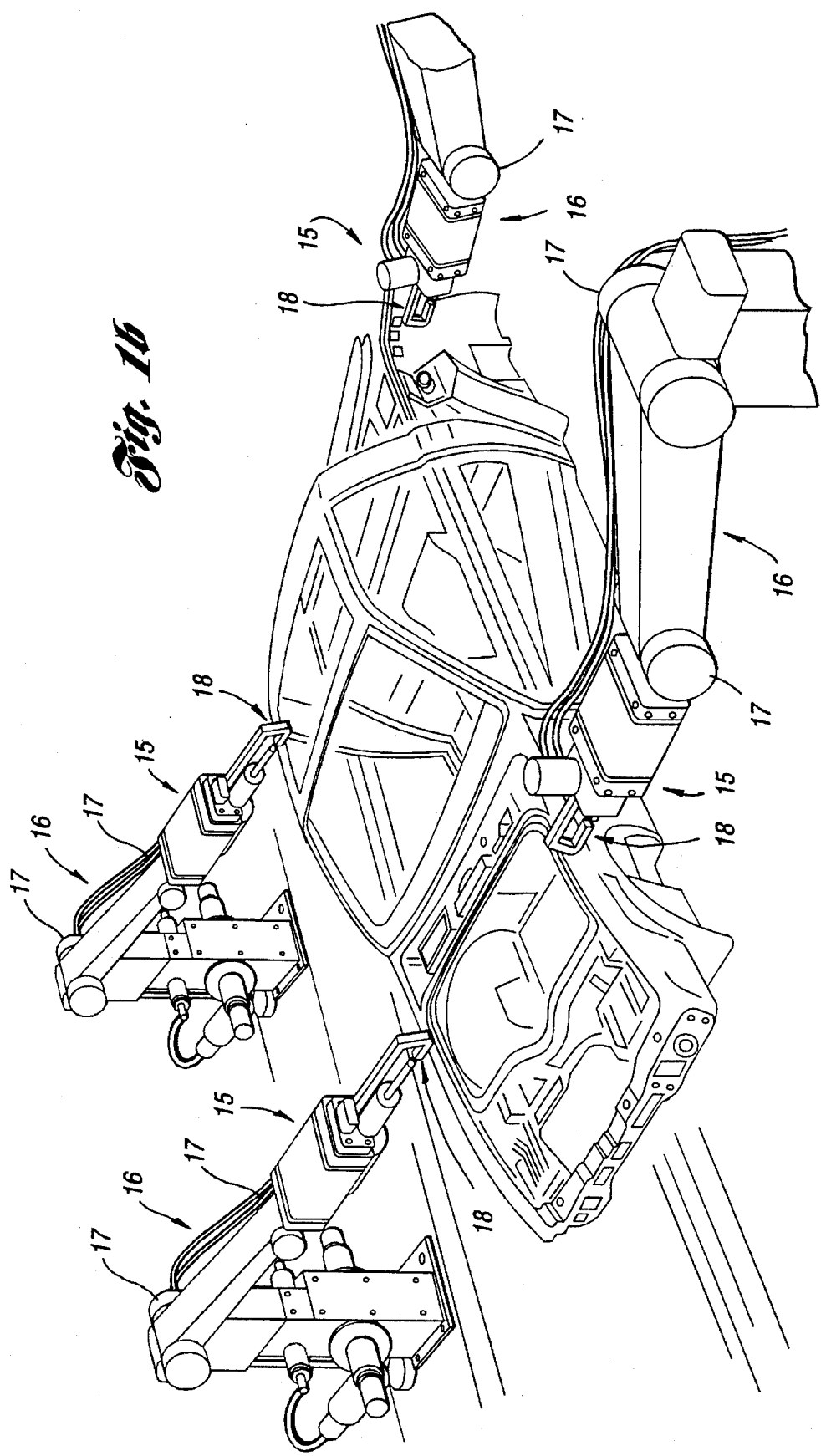

A perspective view of another application of a multi-gun welding system is shown in FIG. 1B. An automobile monocoque 14, to which a number of welding operations are to be performed, is positioned within a manufacturing line. Four weld guns 15 are each positioned in proximity to the monocoque 14 by a corresponding robotic-arm delivery device 16. Within each robotic-arm delivery device 16 is contained a device sensor 17 coupled to each actuator. The device sensors 17 allow the system to determine a pre-weld fit-up position for each of the weld guns 15. After the weld guns 15 are positioned, electrodes 18 within each of the weld guns 15 are advanced upon the monocoque 14. Within each weld gun 15 is a gun sensor for determining the fit-up of the monocoque 14. Welding power is applied to the electrodes 18 upon determining a proper fit-up condition. After the welding operations have completed, the weld guns 15 are opened and retracted to enable the monocoque 14 to be conveyed to a subsequent manufacturing station.

FIG. 2 illustrates a block diagram representation of an embodiment of a multi-gun welding computer system. The system comprises a weld system computer 20 which executes a routine that allows supervision of the multi-gun welding system. The weld system computer 20 communicates with a programmable logic controller (PLC) 22 via an interface 24. One embodiment of the interface 24 is a simple, hard-wired connection between the computer 20 and the PLC 22. A more elaborate opto-electronic interface can also be employed as the interface 24.

A workpiece which is to be welded is initially secured into position by a workpiece fixture 40. The workpiece can be either manually placed and secured in the fixture 40, or automatically clamped in the fixture 40 in response to a signal from the PLC 22. At least one fixture sensor 41 is fitted onto the fixture 40 to provide means for measuring displacements of clamping mechanisms therein. The fixture sensor 41 can further provide means for measuring the position and orientation of the fixture in space.

The PLC 22 then controls the pre-weld positioning of electrodes within a plurality of weld guns, wherein each weld gun comprises at least one electrode. For the purpose of illustration, two representative weld guns 26 and 28 are shown in FIG. 2 to which the PLC controls the position of electrodes 29. The two weld guns 26 and 28 each have corresponding gun sensors 30 and 32 connected. The gun sensors 30 and 32 are used to detect the displacements of the electrodes in each weld gun.

Optionally, the PLC 22 further initiates weld gun delivery devices 33 and 35 to position the weld guns 26 and 28, respectively, in proximity to the workpiece before the guns are closed (i.e., a pre-weld fit-up position). Weld gun delivery devices can be automated, as in a robotic arm, or manual, as in a manually-operated translational slide. The delivery devices each have corresponding delivery device sensing means, such as device sensors 37 and 39, to determine a pre-weld fit-up position for each of the weld guns.

The PLC 22 is also connected to a weld controller 34. The weld controller 34 controls the current passing through the electrodes 29 in the weld guns 26 and 28. Typically, the weld controller comprises at least one silicon controlled rectifier (SCR), with one SCR assigned to control weld power to each set of independently-controllable electrodes. The outputs of the gun sensors 30 and 32, the output of the weld controller 34, the outputs of the device sensors 37 and 39, and the output of the fixture sensor 41 are applied to an analog-to-digital (A/D) converter 36. The A/D converter accepts analog input signals and converts them to digital signals which can be read by the computer 20 and the PLC 22. The weld system computer 20 uses the output from the A/D converter 36 to perform tasks such as detecting whether the workpiece to be welded is positioned correctly before welding power is applied, controlling weld nugget formation by monitoring electrode displacement, determining whether or not a gun is in a home position after the completion of a weld, providing a graphical output display of electrode displacement data, and determining the quality of the welds based upon the electrode displacement data.

FIG. 3 shows a flow chart of an embodiment of a weld routine executed within the computer 20 for performing a weld operation on a workpiece. Initially, a command is given in block 42 to close the guns. The step of closing the guns encompasses the step of advancing the weld guns to a position near the workpiece using the gun delivery devices, if necessary, followed by the step of advancing the electrodes of the guns upon the workpiece so as to initiate contact with the workpiece. The resulting displacements of the electrodes after contact is initiated with the workpiece is referred to as fit-up. The fit-up of the workpiece is next determined in block 43. Conditional block 44 examines whether or not the fit-up of the workpiece is within specified tolerances. If the fit-up of the workpiece is not within the tolerance, an alarm indicating improper workpiece fit-up is executed in block 46. At this time, the device that is indexing the weld gun outputs its location for calculating the space-gauge location of the workpiece to the computer 20.

If the fit-up of the workpiece and the delivery device is within the tolerance, the next step is to commence welding power in block 48. Prior to an initiation of welding power, a weld schedule is selected based upon a pre-weld fit-up tip wear measurement of each weld electrode. After initiating the welding power, the gun sensors are scanned in block 50 to determine the relative positions of the electrodes during the welds. This allows weld quality to be monitored and controlled by varying the time during the welds. Conditional block 52 examines whether the weld has completed. If the welds have not completed, then the routine branches back to block 50 to scan the gun sensors. The repeated scanning of the gun sensors over the duration of the weld allows the computer to obtain a time sequence of measured positions of the electrodes.

If the welds have been completed in block 52, then conditional block 54 determines if the guns are in their corresponding home positions. If any of the guns are not in their home positions, meaning that at least one gun electrode is fused to a workpiece surface, then a stuck gun alarm is activated in block 56. Further execution of the routine is halted until the stuck gun condition is corrected, as indicated by conditional block 58. If all of the guns are in their home positions, then conditional block 60 checks if there are any further welds that are to be performed on the workpiece by the multi-gun system. If further welds are to be performed, then the workpiece is repositioned, if necessary, and the routine returns to block 42. Subsequent iterations of the routine can be modified to produce multi-gun welds different from those performed in the first iteration.

Figure 4:
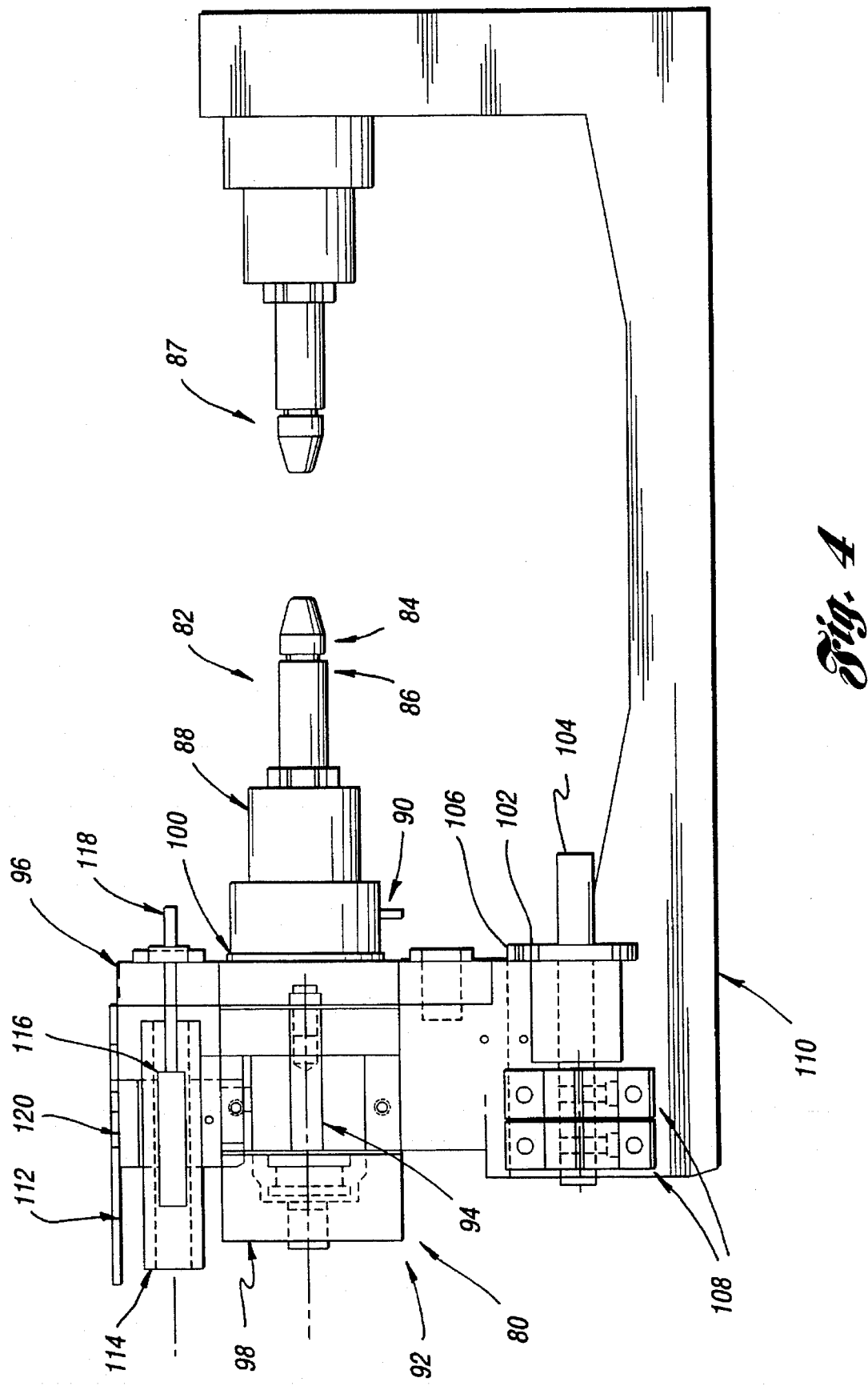
FIG. 4 is a detailed plan view of an illustrative resistance welding gun with a retrofitted weld gun sensor.

If no further welds are to be performed on the workpiece by the multi-gun system, then an analysis of the welds is performed in block 62. The analysis of the welds 62 is based on the time sequence data measured and recorded by block 50. Conditional block 64 decides whether the welds are acceptable or unacceptable based on the results of the weld analysis 62 using specified displacement objectives. If the weld is deemed unacceptable, then an unacceptable-weld alarm is activated in block 66. The location and part number of the unacceptable weld can be marked on the part for later re-work of the workpiece at the location of the unacceptable weld. If the welds are acceptable, then the routine is exited by return block 68. The routine can then be executed again if welds are to be performed on another workpiece. FIG. 4 shows an embodiment of a retrofit gun sensor, which can be employed for gun sensors 30 and 32 from FIG. 2, attached to an illustrative welding gun assembly. The welding gun assembly 80 contains a welding electrode 82 which consists of electrode cap 84 and electrode shaft 86, and a ground electrode 87. Electrode shaft 86 is secured by means of an electrode holder 88 which is connected to a terminal 90 for supplying a voltage potential to electrode 82. The welding electrode 82 is positionable by means of fluid-powered cylinder 92. This cylinder consists of a cylinder rod 94 rigidly attached to an electrode positioning bracket 96 and cylinder housing 98.

The retrofit gun sensor comprises the electrode positioning bracket 96 used for determining the displacement of the welding electrode 82. The electrode positioning bracket 96 is secured to the electrode holder 88. The electrode positioning bracket 96 is electrically isolated from the electrode holder by means of insulator 100. This insulation is important given the high currents produced in the welding process and the resulting high intensity magnetic fields which will be present. The electrode positioning bracket 96 is stabilized by means of a shaft assembly 102 which consists of a shaft 104, a bushing 106 which holds the shaft 104 and is affixed to the electrode positioning bracket 96, and shaft clamps 108 which affix the shaft 104 to arm 110. This shaft 104 eliminates rotation of electrode positioning bracket 96 in the plane radial to cylinder rod 94. Although the shaft assembly 102 is beneficial in providing rotational stability of the electrode positioning bracket 96, its inclusion is not required in alternative embodiments of the present invention.

The position of electrode positioning bracket 96 and thus, the position of the electrode is determined by means of a translational sensor such as a linear variable displacement transducer (LVDT) 112. Alternatively, a laser-based translational sensor could also be employed. The transducer 112 consists of a transducer body 114 having a cylindrical core receptacle, a transformer core 116 and a core rod 118. The transducer body is attached to arm 110 by means of isolating clamp 120. This clamp is constructed of phenolic material so as to insulate transducer body 114 from arm 110. This insulation is important, since the LVDT 112 is susceptible to induced noise. The high currents and magnetic fields previously mentioned require the transducer to be insulated in this manner. For the same reason, transducer body 114 is sheathed in stainless steel which is substantially nonmagnetic. Further, core rod 118 is constructed of stainless steel.

Next, an embodiment of a retrofit gun sensor, comprising an electrode positioning bracket and a linear variable displacement transducer, is presented. This gun sensor can be retrofit to an existing welding gun assembly consisting of an electrode actuated by a fluid-powered cylinder. Moreover, a plurality of the gun sensors can be retrofit to an existing multi-gun welding apparatus so that the multi-gun computer system of the present invention can be employed to monitor and control its operation. The gun sensor of the present invention overcomes the problems of the prior art by sensing the electrode position by means of a novel electrode positioning bracket. An insulating sensor clamp is further provided to electrically isolate the sensor for suppressing the induced noise.

FIG. 5A shows the electrode positioning bracket 130 for mounting on an existing electrode, electrode holder, piston rod, or other similarly coupled part, similar to that those parts described earlier or their equivalents. Hole 132 receives the part to which electrode positioning bracket 130 is mounted via an insulated bushing 136. Bushing 136 insulates the electrode positioning bracket 130 from the electrode as does insulator 100 in FIG. 4. The size and shape of hole 132 is chosen to match the part to which the electrode positioning bracket is mounted when considering the thickness and shape of insulated bushing 136. A receptacle 138 is included to the electrode positioning bracket 130.

FIG. 5B presents the attachment of the body of the translational sensor, specifically the linear variable displacement transducer (LVDT) 142, to a cylinder housing 144 by means of a mounting bracket with mating jaws 146 and 148. FIG. 5C and FIG. 5D present side views of a weld gun assembly 150. These figures highlight the rigid attachment of LVDT rod 140 with the electrode positioning bracket 130, spaced apart from, and in parallel alignment to cylinder rod axis 152.

An example of a multi-gun welding procedure for making two sets of two welds (a total of four welds) is given to illustrate a more specific embodiment of the present invention incorporating FIGS. 2, 3, 4, and 5. The multi-gun weld apparatus in this example comprises two weld guns 30 and 32; and one weld controller 34 which initiates weld power simultaneously to the two weld guns 30 and 32. After the initial positioning of the workpiece to a first weld position by the workpiece fixture 40, the command is given by the weld system computer 20 to the PLC 22 via the interface 24 to advance the gun delivery devices 33 and 35 from corresponding home positions to corresponding pre-weld fit-up positions. The command is then given to close the two weld guns 30 and 32. Pressure is applied by means of a cylinder in each of the weld guns 30 and 32. The weld guns 30 and 32 close, thus initiating contact between the electrodes of the welding gun assemblies and the workpiece to be welded.

The linear variable displacement transducers of the two gun sensors 30 and 32 output analog voltages representative of the relative displacement of the gun electrodes after the preceding fit-up of the workpiece. Further, the device sensors 37 and 39 provide analog voltages representative of the fit-up positions of the gun delivery devices 33 and 35, and the fixture sensor 41 provides analog voltages representative of the position of the workpiece within the fixture 40. The A/D converter 36 then provides digital representations of the fit-up displacements to the weld system computer 20. The fit-up displacements can be used to spatially gauge the position and orientation of the workpiece within the welding apparatus. Proper fit-up can thus be determined by comparing each of the fit-up displacements to fit-up displacements measured earlier using a master workpiece, and determining whether the differences are within specified dimensional tolerances. A more elaborate method of determining proper fit-up compares mathematical functions of the fit-up displacement data to mathematical functions of the fit-up displacement data for the master workpiece, and checks whether the differences are within specified tolerances. These mathematical functions would be selected, for example, to determine the position and orientation of the workpiece with respect to a global coordinate frame based on the fit-up displacement data. A general statement that describes the condition of improper fit-up is that improper fit-up is detected when the fit-up displacements of the gun sensors are within a specified rejection region relative to the determined locations of each of the gun delivery devices.

If the two fit-ups are not within the specified tolerances, which could indicate conditions such as an incorrectly positioned workpiece, a missing electrode tip, an excessively worn electrode, a missing workpiece, or an incorrectly positioned gun delivery device, then the computer 20 sends an improper fit-up alarm to the PLC 22 and displays the type of alarm on a CRT (not shown). The system halts further welding operation until an operator corrects the improper state of the workpiece, gun, or gun delivery device.

If the two fit-ups are within specified tolerances, then the weld system computer 20 sends a command via the interface 24 to the PLC 22 to start the weld. The PLC 22 then commands the weld controller 34 to initiate power to the gun electrodes. Weld voltage is applied across the welding and ground electrodes, thus creating weld currents through the workpiece.

Figure 6A:
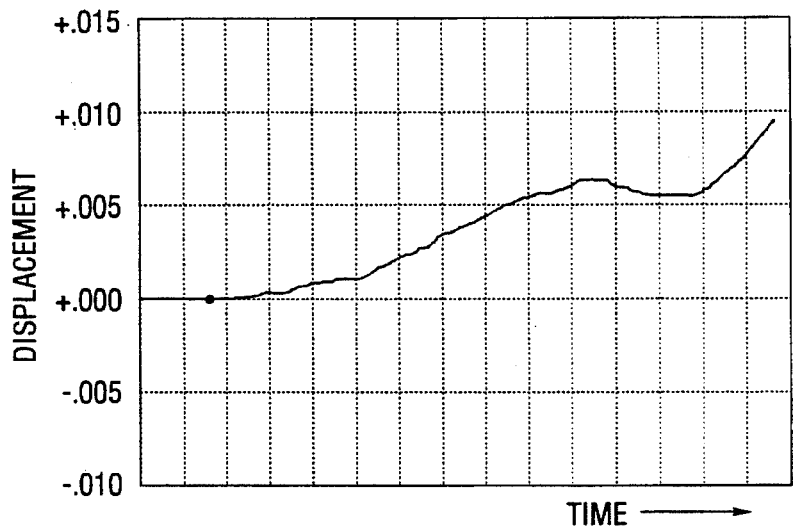
FIG. 6(A–C) is a series of electrode displacement curves which compare a good weld to two weld-fault conditions.

During the welding process, the weld system computer 20 monitors the amount of expansion or penetration of the weld nuggets using displacements of the gun electrodes via sensors 30 and 32 and the A/D board 36. FIG. 6A presents the displacement voltage characteristic, as given by linear variable displacement transducer 112, for a representative good expansion weld. As time increases the weld nugget grows as shown by positive displacement 160. Weld voltage is cut off at 162 once sufficient weld nugget growth is obtained. The weld voltage to a welding gun is cut off after a fixed amount of expansion so as to avoid weld nugget expulsion, a condition whereby weld expansion is taken to such a point such that the weld nugget material is forced out of the weld junction. The electrode is held in place for a short interval of time before being retracted 164 to ensure proper solidification of the weld nugget.

Figure 6B:
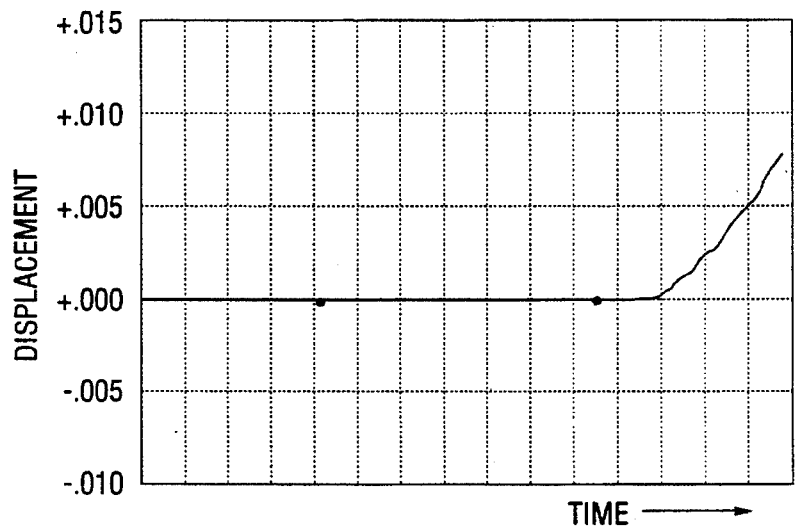
Figure 6C:
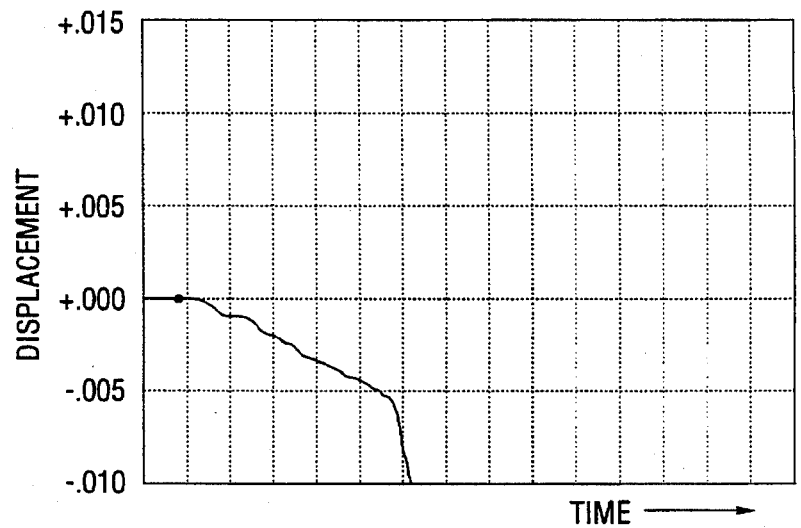

If the weld does not sufficiently expand after a preset amount of time, as presented by the displacement voltage characteristic in FIG. 6B due to some factor such as the presence of oil or other contaminants on the workpiece, the weld voltage is cutoff and a fault is indicated in the post-weld analysis. If the penetration of the electrode increases rather than decreases as presented by the displacement voltage characteristic in FIG. 6C, due to some factor such as the electrode being positioned near the edge of the workpiece, the weld voltage is cutoff and a fault is indicated in the post-weld analysis.

After completion of the two welds based on the control of weld-nugget growth given above, the PLC 22 commands the two weld guns to retract. The electrodes are then retracted by means of their respective cylinders. The weld system computer 20 then examines the displacements of the gun electrodes to determine if all of the electrodes have indeed retracted, or in the alternative, any electrode has become fused to the welding surface. If at least one of the electrodes have not retracted, then the stuck gun alarm is sent to the PLC 22 to notify the operator of the stuck gun condition. To avoid possible damage to the apparatus by proceeding with further positioning steps, the device for indexing the weld gun into position is halted. The operator must correct the stuck gun condition before the computer 20 allows subsequent welding to continue.

If the guns have retracted, then the workpiece is rotated to a second weld position. The gun delivery devices are then advanced to pre-weld fit-up positions, the two weld guns are fit-up to the workpiece at its second position, and the entire process is repeated. After completion of the second weld step, the weld guns and delivery devices are retracted again, resulting in a total of four welds performed on the workpiece.

After the four welds have completed, the post-weld quality analysis is performed based on the electrode displacement data recorded by the computer 20. Each of the four welds is classified into one of the following categories: good weld, good weld with expulsion, good weld delayed response, marginal weld, bad weld, and edge weld. In an expansion weld, a "good weld" is a weld having a weld nugget expansion that exceeds a first minimum expansion value when weld power is "on" in the allotted cycle time, but not exceeding a weld expulsion limit. In a penetration weld, a "good weld" is a weld having a weld nugget penetration that exceeds a first minimum penetration value when weld power is "on" in the allotted cycle time without exceeding the weld expulsion limit. If the weld expulsion limit is exceeded in an otherwise good weld, then the weld is classified as a "good weld with expulsion". A weld is classified as a "good weld delayed response" if the weld nugget expansion or penetration is within specifications, but either the penetration or the expansion occurred late in the cycle relative to a good weld. If either the expansion or penetration does not exceed the first minimum expansion or penetration does not exceed the first minimum expansion or penetration value, but it does exceed a second minimum expansion or penetration value, respectively, then the weld is classified as a "marginal weld". A weld is classified as a "bad weld" if either the expansion or penetration does not exceed the second minimum expansion or penetration value, respectively. A weld is classified as an "edge weld" if its displacement is greater than or equal to a minimum edge weld limit.

A further condition that can be detected using an embodiment of the present invention is the condition of electrode cladding. This condition is of concern when resistance welding workpieces made of aluminum. The affinity of aluminum to a copper electrode results in an impregnation of molten aluminum to the electrode during welding. When a significant amount of aluminum impregnates into the electrode, the possibility exists of blowing a hole in the workpieces during the next weld. Typically, the exhibited fit-up behavior leading up to such a condition is one where steady wear in the electrode tip is present for a number of welds, followed by a significant apparent growth in the electrode tip after a single weld. In addition to space gauging, the present invention can examine the differences in the fit-up displacements over successive welds to detect the condition of electrode cladding. After detecting such a condition, the electrode tip can be either replaced or redressed before any further welds are performed by the electrode.

Based on the results of the analysis, the computer 20 sends alarm signals to the PLC 22 to notify the operator of such conditions as:

(i) the percentage of successive "good welds with expulsion" events exceeds a user-specified limit of acceptance;

(ii) the percentage of successive "marginal weld" events exceeds a user-specified limit;

(iii) the percentage of successive "over material thickness limit" events exceeds a user-specified limit;

(iv) the percentage of successive "under material thickness limit" events exceeds a user-specified limit;

(v) the percentage of successive "under displacement limit" events exceeds a user-specified limit;

(vi) the percentage of successive "edge weld" events exceeds a user-specified limit; and (vii) the tip wear limit is at 100%.

If an alarm is sent to the PLC 22 based on the post-weld quality analysis, the computer 20 commands the system to halt at the end of the production cycle. If no alarms are sent to the PLC 22 based on the post-weld quality analysis, then the process continues with the introduction of a new workpiece to be welded.

One with ordinary skill in the art will recognize that the four-weld example given above is merely an illustration of the operation of an embodiment of the present invention, and that the present invention can be used for any plurality of weld guns, with arbitrary subsets of the weld guns having independently controllable weld power, and any user-defined weld sequence on variable thickness of material per weld preset by weld location on the workpiece.

The present invention can further include part marking capability based on the result of the post-weld quality analysis. In this embodiment, the welded workpiece would be marked using either a laser, a stamp, paint, hot wax, or other suitable means of marking, in response to a subset of the alarm signals. This results in gaining the ability to identify badly-welded workpieces for later retrieval, which is advantageous in an in-line manufacturing environment. Also, the badly-welded workpieces can be indexed based on date and part number.

Figure 7:
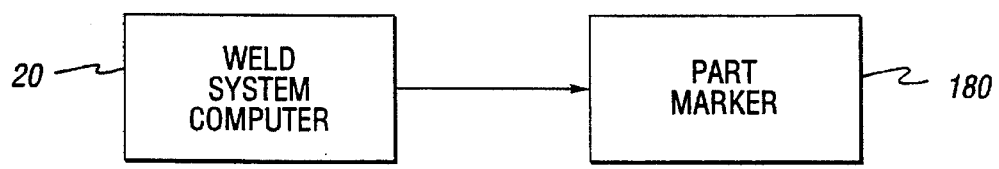
FIG. 7 is a block diagram illustrating a part-marking system.

A block diagram illustrating the part marking system is shown in FIG. 7. Based on the post-weld quality analysis performed in the computer 20, a supervisory command is transmitted to the marking device 180 to mark the workpiece if an unacceptable weld condition is detected.

Figure 8:
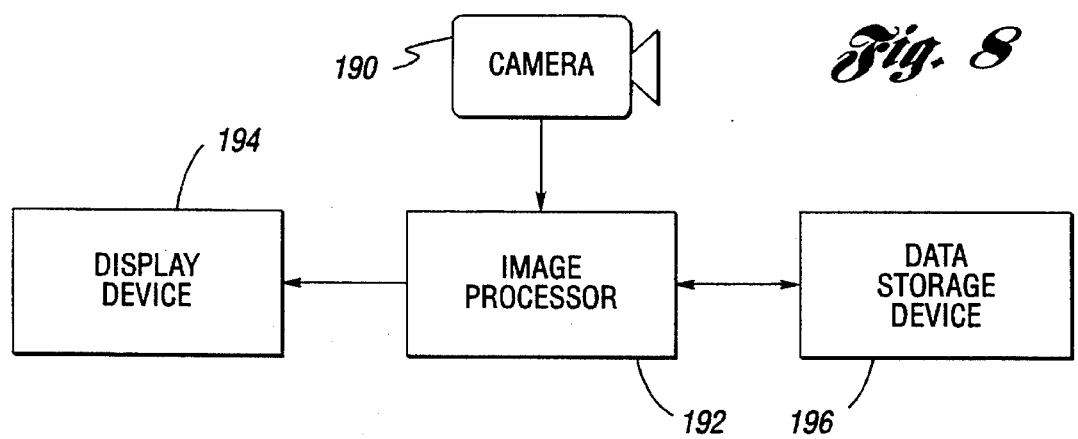
FIG. 8 is a block diagram illustrating a visual weld quality analysis system.

A system providing means of displaying an image of the workpiece for the purpose of analyzing the quality of the fit-ups and the welds is illustrated by the block diagram in FIG. 8. The system includes a camera 190 capable of producing a signal representative of the image of the workpiece. The camera 190 can be of a charge-coupled device (CCD) type, or the like, and can be installed in a weld gun. An image processor 192 is coupled to the camera 192 for forming a display image signal from the signal produced by the camera 190. The image processor 192 can be formed by the computer 20 with a frame-grabbing analog-to-digital converter board installed therein. Alternatively, the image processor 192 can be separate from the computer 20. A display device 194, such as a computer monitor, is coupled to the image processor for displaying an image formed from the display image signal. The image processor 192 and the display device 194 cooperate to provide the display image of the workpiece based on the signal produced by the camera 190. A data storage device 196, such as a hard disk drive or a dedicated optical disk drive, is coupled to the image processor 192 to allow storing and retrieving of workpiece images.

The image-based system for analyzing the quality of the fit-ups and the welds can be employed in the following manner. A corresponding CCD camera 190 is installed in each weld gun. Video outputs of the CCD cameras 190 would be selectively applied to the frame-grabbing analog-to-digital board installed in the computer 20. The computer 20 would store selected images during the weld process, such as a fit-up image and a post-weld image, on the data storage device 196. The user would have an option to store either all of the images or only the images where a fault condition is detected during the weld process, such as a poor fit-up or a bad weld. The image-based system allows the quality of welds being produced by a welding system to be visually analyzed either on-line or off-line, and either at the plant or at a remote location. The use of video images aids in eliminating difficulties that occur when attempting to verbally describe a resulting state of a workpiece produced during a fault condition. Furthermore, the stored images can be archived to provide a historical record of the welds being produced by a welding system.

Figure 9:
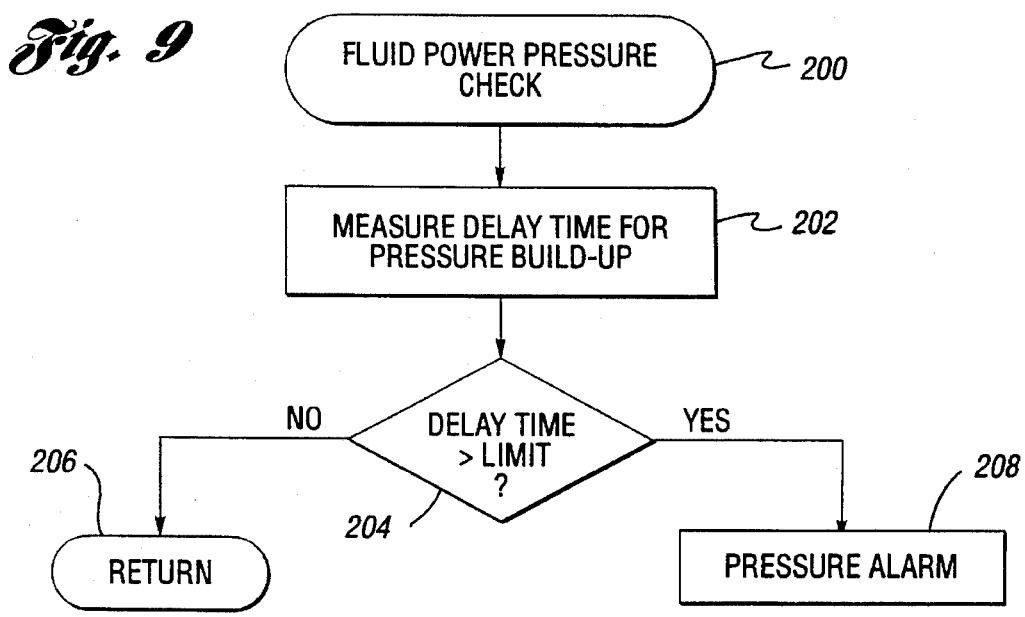
FIG. 9 is a flow chart of a method of performing a fluid power pressure check.

Turning now to FIG. 9, a method of performing a fluid power pressure check in each of the weld guns prior to the initiation of weld power is illustrated. Once the weld guns are closed, and the electrodes are fit-up to the workpiece, the fluid power pressure check is initiated in block 200. Typically, a loss in fluid pressure is exhibited in a cylinder after the cylinder has been advanced to the fit-up location. The loss in pressure results in a delay time required for the fluid pressure to build back up to a required pressure. Block 202 measures the delay time for the fluid pressure to build up. Conditional block 204 compares the measured delay time to a pressure limit. If the delay time is less than the pressure limit, then execution is returned to the main routine of FIG. 3 by block 206. If the delay time is greater than the pressure limit, which indicates possible line failure problems, weld cylinder O-ring seal problems, or hydraulic system problems, a pressure alarm is initiated in block 208.

The previously described versions of the present invention have many advantages, including the ability to retrofit an existing multi-gun welding system with gun sensors, thus allowing the incorporation of the multi-gun computer-integrated welding system of the present invention to monitor and control the multi-gun welding process. A further advantage of the present invention is the ability to perform space gauging of the fit-up and overall dimensioning of the workpieces before welding power is applied.

A further advantage of the present invention is the ability to perform space gauging of the fit-up of the workpieces before welding power is applied. An overview of an embodiment of the process of space gauging is as follows. The surface of an arbitrary workpiece can be divided into a set of subsurfaces, wherein each of the subsurfaces is defined by a subsurface equation and a set of constraints. Each subsurface equation has a set of parameters which determines the position and orientation of the subsurface of the workpiece. Furthermore, the parameters can provide additional information on the geometry of the subsurface using such quantities as curvature, slope, and focal point, to name a few. The values of the parameters for a specific workpiece being positioned for welding can be determined based on the fit-up displacements of the gun sensors and delivery device sensors. Mathematically, the fit-up displacements provide the locations of a set of points on the workpiece surface. As an illustration, the location of a point on the surface of the monocoque 14 in FIG. 1B is determined by combining the displacement of the gun sensor (not shown), the known length of the weld gun, and the position of the robotic-arm delivery device 16 as determined by the device sensors 17. This set of points can be used to estimate the values of the parameters of the workpiece subsurfaces using an optimization criterion such as least-squares regression.

By storing the estimated parameters for each welded workpiece, a historical record of the space gauging of the workpieces results. This historical record can be used to aid in determining the cause of an improperly-fitted-up workpiece. For example, when the fit-ups of a workpiece are not within specified tolerances, time series of the recent history of each of the estimated parameters can be plotted to determine if a systematic trend is evident in any parameter. As an illustration, suppose that the time series plot of a parameter relating to the orientation of the workpiece about an axis displays an increasing trend. The operator would use this information as a basis for the diagnosis of a probable cause of the improper fit-up, e.g., he/she would examine if the chuck or jig is incrementally rotating due to each successive production cycle. As a second illustration, suppose that the time series plot of a curvature parameter for the workpiece is decreasing in time. In this case, the diagnostics performed by the operator would include examining whether the workpieces are within specifications of the manufacture.

The historical record also can be used to prevent some causes of improperly fit-up workpieces. Time series plots of the estimated parameters can be displayed to the operator after each production cycle so that a trend toward improper fit-up can be detected before an improper fit-up actually occurs. This process can be automated by including a statistical quality control routine in the computer. The computer would signal the operator when any of the estimated parameters approach an out-of-control condition.

The resulting identification of workpieces with poor fit-up before welding power is applied yields welded workpieces with improved strength, improved quality, and extends the lives of the plurality of electrodes.

It should be noted that the present invention may be used in a wide variety of different constructions encompassing many alternatives, modifications, and variations which are apparent to those skilled in the art. Accordingly, the present invention is intended to embrace all such alternatives, modifications, and variations as fall within the spirit and broad scope of the appended claims.

What is claimed is:

1. A resistance weld-gun assembly for joining a plurality of workpieces, comprising:

a resistance welding gun including a fluid-powered cylinder having a cylinder housing and a cylinder rod axially shiftable relative to the cylinder housing, an electrode holder, mechanically coupled to the cylinder rod, for securing an electrode, and an electrode terminal electrically coupled to the electrode holder a weld power source for providing electrical power to the electrode terminal;

an electrode position bracket which is mechanically coupled to the piston rod and extending outward therefrom, said electrode position bracket being electrically isolated from the electrode;

a linear displacement sensor for measuring relative position of the electrode position bracket with respect to the cylinder housing and for generating an electrical displacement signal in proportion to the relative position of the position bracket and the cylinder housing, wherein the displacement sensor is radially displaced from, and parallel to the cylinder rod axis;

a sensor mounting bracket rigidly affixing the linear displacement sensor to the cylinder housing in at least two axial spaced apart locations; and a weld computer responsive to the displacement sensor for insuring proper pre-weld part fit up and for regulating the power output of the weld power source in real time during the joining of the plurality of workpieces.

2. The weld-gun sensor assembly of claim 1 wherein the sensor employs substantially nonmagnetic stainless steel sheathing.

3. The weld-gun sensor assembly of claim 1 wherein the sensor comprises a linear variable displacement transducer.

4. A multi-gun computer-integrated welding system for supervising a joining of a plurality of workpieces, the system comprising:

a plurality of weld guns, each of the plurality of weld guns comprising a welding electrode, a cylinder assembly having a cylinder housing, and a piston and a piston rod attached thereto for linearly displacing the welding electrode, wherein at least one of the weld guns is positionable between a pre-weld fit-up position and a retracted home position;

a device sensor cooperating with a positionable weld gun for determining weld gun locations;

a fixture for securing the plurality of workpieces in a welding location;

fixture sensing means, cooperating with the fixture, for measuring a location of the fixture;

a plurality of displacement sensing means, coupled to each of the weld guns, for measuring displacements of the welding electrodes relative to the corresponding cylinder housings;

fit-up verification means, operatively responsive to the device sensor, the fixture sensing means, and the plurality of displacement sensing means, for determining a proper positioning in space of the plurality of workpieces and the positionable weld guns before welding power is applied by determining whether the location of the positionable weld gun, the location of the fixture, and the displacements of the welding electrodes are within or outside a specified rejection region when the welding electrodes are in contact with the plurality of workpieces; and weld power supply, operatively responsive to the fit-up verification means, for initiating an application of electrical power to the welding electrodes if the displacements are outside the specified rejection region, and for inhibiting the application of power to the welding electrodes if the displacements are within the specified rejection region.

5. The system of claim 4 further comprising at least one gun delivery device for variably positioning at least one of the plurality of weld guns between a corresponding home location and a corresponding pre-weld fit-up location.

6. The system of claim 5 further comprising delivery device sensing means, coupled to each of the at least one gun delivery device, for determining a location of each of the at least one gun delivery device, wherein the fit-up verification means is further responsive to the delivery device sensing means and wherein the rejection region is relative to the determined location of each of the at least one gun delivery device.

7. The system of claim 4 further comprising a fixture for securing the plurality of workpieces in a welding location.

8. The system of claim 7 further comprising fixture sensing means, coupled to the fixture, for measuring a positioning of the fixture in space, wherein the fit-up verification means is further responsive to the fixture sensing means and wherein the rejection region is relative to the measured positioning of the fixture in space.

9. The system of claim 4 wherein the fixture includes a clamping mechanism for securing the plurality of workpieces.

10. The system of claim 9 wherein said fixture sensing means measures a displacement of the clamping mechanism, wherein the fit-up verification means is further responsive to the fixture sensing means and wherein the rejection region is relative to the measured displacement of the clamping mechanism.

11. The system of claim 4 wherein the displacement sensing means comprise a plurality of gun sensors.

12. The system of claim 11 wherein each of the plurality of gun sensors comprises:
    an electrode position bracket which is mechanically coupled to the piston rod, but electrically isolated from the welding electrode of a one of the plurality of weld guns;
    a linear translation sensor, coupled to the cylinder housing of the one of the plurality of weld guns, for measuring relative position of the electrode position bracket with respect to the cylinder housing and for generating an electrical signal in proportion to the relative position, wherein the transducer is displaced from, and parallel to the axis aligned with the piston rod.

13. The system of claim 12 wherein each linear translation sensor comprises a linear variable displacement transducer.

14. The system of claim 4 wherein the fit-up verification means comprise:
    an analog-to-digital converter, operatively responsive to the displacement sensing means, for converting outputs of the displacement sensing means to digital signals; and
    a digital computer, responsive to the analog-to-digital converter, for outputting a signal representing an improper positioning condition based on execution of a stored routine.

15. The system of claim 14 wherein the weld power control means comprise:
    a programmable logic controller, electrically coupled to the digital computer by an interface; and
    a weld controller, electrically coupled to the welding electrodes and responsive to the programmable logic controller, for providing the application of electrical power to the welding electrodes;
    wherein the programmable logic controller inhibits commanding the weld controller to provide the application of electrical power to the welding electrodes in response to the improper positioning condition signal from the digital computer.

16. The system of claim 4 further comprising imaging means for displaying an image of the plurality of workpieces for a visual analysis of quality.

17. The system of claim 16 wherein the imaging means includes:
    a camera for providing a signal representative of the image of the plurality of workpieces; and
    display means, operatively responsive to the camera, for providing a display image of the plurality of workpieces based on the signal provided by the camera.

18. The system of claim 17 wherein the display means includes:
    an image processor, coupled to the camera, for forming a display image signal; and
    a display device, coupled to the image processor, for providing the display image from the display image signal.

19. The system of claim 18 wherein the display device is remotely located from the camera.

20. The system of claim 18 wherein the display means further includes a data storage device, in communication with the image processor, for storing data derived from the display image signal.

21. The system of claim 20 wherein the image processor is further capable of forming the display image signal from data stored in the data storage device.

22. A multi-gun computer-integrated welding system for joining of a plurality of workpieces, the system comprising:
    a plurality of weld guns simultaneously cooperating with the workpieces to be joined, each of the plurality of weld guns comprising a welding electrode, a cylinder assembly having a cylinder housing, and a piston and a piston rod attached thereto for linearly displacing the welding electrode, wherein at least one of the weld guns is positionable between a pre-weld fit-up position and a retracted home position;
    a weld gun positioning device;
    a device sensor cooperating with a positionable weld gun for determining the weld gun location;
    displacement sensing means, coupled to each of the weld guns, for measuring pre-weld fit-up and substantially simultaneously measuring displacements of the welding electrodes relative to the corresponding cylinder housings during the joining of the plurality of the workpieces;
    computing means, operatively responsive to the displacement sensing means, for issuing supervisory commands prior to initiating and during the joining of the plurality of the workpieces based on the device sensor, the internal displacement and weld gun position measured displacements and a predetermined weld schedule, a device sensor cooperating with a positionable weld gun for determining weld gun locations; and
    control means, operatively responsive to the computing means, for controlling the application of electrical power to the welding electrodes, as a function of the supervisory commands generated by the computing means based on the measured displacement and the predetermined weld schedule.

23. The system of claim 22 further comprising marking means, operatively responsive to the computing means, for marking at least one of the workpieces in order to provide a visual indication than an unacceptable weld condition has occurred.

24. The system of claim 23 wherein the marking means marks at least one of the workpieces if an unacceptable weld condition is detected based upon the output measurements of the displacement serving means.

25. The system of claim 23 wherein the marking means marks the workpieces to indicate weld quality and date.

26. The system of claim 23 wherein the marking means marks the workpiece to provide a part number identification.

27. The system of claim 22 wherein the computing means comprise:
    stuck-gun detection means, for issuing a command to inhibit electrical power to the welding electrodes if at least one of the welding electrodes have not retracted from a welding surface after completion of a weld.

28. The system of claim 22 wherein the computing means comprise:

weld analysis means, for issuing a command to notify an operator if an unacceptable weld condition is detected.

29. The system of claim 22 wherein the computing means comprise:

weld quality control means, for issuing a command to inhibit electrical power to a one of the welding electrodes if the displacement of the one of the welding electrodes exceeds a selected threshold.

30. The system of claim 22 wherein the computing means comprise:

an analog-to-digital converter, operatively responsive to the displacement sensing means, for converting outputs of the displacement sensing means to digital signals; and a digital computer, responsive to the analog-to-digital converter, for outputting the supervisory commands based on execution of a stored routine.

31. The system of claim 22 wherein the control means comprise:

a programmable logic controller, electrically coupled to the digital computer by an interface; and a weld controller, electrically coupled to the welding electrodes and responsive to the programmable logic controller, for providing the application of electrical power to the welding electrodes;

wherein the programmable logic controller commands the application of electrical power by the weld controller to the welding electrodes in response to the supervisory signals from the digital computer.

32. The system of claim 22 wherein the displacement sensing means comprise a plurality of gun sensors.

33. The system of claim 32 wherein each of the plurality of gun sensors comprises:

an electrode position bracket which is mechanically coupled to the piston rod and extending outward therefrom, said electrode position bracket being electrically isolated from the welding electrode of a one of the plurality of weld guns; and a linear displacement sensor of the one of the plurality of weld guns, for measuring relative position of the electrode position bracket with respect to the cylinder housing and for generating an electrical displacement signal in proportion to the relative position of the position bracket and the cylinder housing, wherein the displacement sensor is radially displaced from, and parallel to the axis aligned with the piston rod.

34. The system of claim 33 wherein each linear translation sensor comprises a linear variable displacement transducer.

35. The system of claim 22 wherein the computing means comprise:

fit-up verification means, for issuing a command to apply forces to the welding electrodes so as to initiate contact with the workpieces, and for issuing a command to inhibit electrical power to the welding electrodes if the displacements of the electrodes in response to the force application are within a specified rejection region, and for issuing a command to initiate electrical power to the welding electrodes if the displacements of the electrodes in response to the force application are outside a specified rejection region.

36. The system of claim 25 further comprising at least one gun delivery device for variably positioning at least one of the plurality of weld guns between a corresponding home location and a corresponding pre-weld fit-up location.

37. The system of claim 36 further comprising delivery device sensing means, coupled to each of the at least one gun delivery device, for determining a location of each of the at least one gun delivery device, wherein the fit-up verification means is further responsive to the delivery device sensing means and wherein the rejection region is relative to the determined location of each of the at least one gun delivery device.

38. The system of claim 35 further comprising a fixture for securing the plurality of workpieces in a welding location.

39. The system of claim 38 further comprising fixture sensing means, coupled to the fixture, for measuring a positioning of the fixture in space, wherein the fit-up verification means is further responsive to the fixture sensing means and wherein the rejection region is relative to the measured positioning of the fixture in space.

40. The system of claim 38 wherein the fixture includes a clamping mechanism for securing the plurality of workpieces.

41. The system of claim 40 further comprising fixture sensing means, coupled to the fixture, for measuring a displacement of the clamping mechanism, wherein the fit-up verification means is further responsive to the fixture sensing means and wherein the rejection region is relative to the measured displacement of the clamping mechanism.

42. The system of claim 22 further comprising imaging means for displaying an image of the plurality of workpieces for a visual analysis of quality.

43. The system of claim 42 wherein the imaging means includes:

a camera for providing a signal representative of the image the plurality of workpieces; and display means, coupled to the camera, for providing a display image of the plurality of workpieces based on the signal provided by the camera.

44. The system of claim 43 wherein the display means includes:

an image processor, coupled to the camera, for forming a display image signal; and a display device, coupled to the image processor, for providing the display image from the display image signal.

45. The system of claim 44 wherein the display device is remotely located from the camera.

46. The system of claim 44 wherein the display means further includes a data storage device, in communication with the image processor, for storing data derived from the display image signal.

47. The system of claim 46 wherein the image processor is further capable of forming the display image signal from data stored in the data storage device.

48. A computer integrated welding system for joining a plurality of workpieces, the system comprising:

a weld gun having a welding electrode, a cylinder assembly having a cylinder housing, and a piston and piston rod attached thereto for linearly displacing the welding electrode;

a displacement sensor coupled to the weld gun for measuring the displacement of the welding electrode relative to the cylinder housing;

a weld power source for controlling an application of force and for controlling an application of electrical power to the welding electrode;

a weld computer, operatively responsive to the displacement sensor, for providing a fault signal in the event a good weld is not completed; and a marking device, operatively responsive to the fault signal, for physically marking the workpiece to indicate if a good weld has not been made.

49. The system of claim 48 wherein the marking device marks the workpieces if an unacceptable weld condition is detected by the weld system computer.

50. The system of claim 48 wherein the weld computer regulates the application of power from the power source to vary weld power in real time responsive to the displacement sensor.

* * * * *